Patented May 29, 1923.

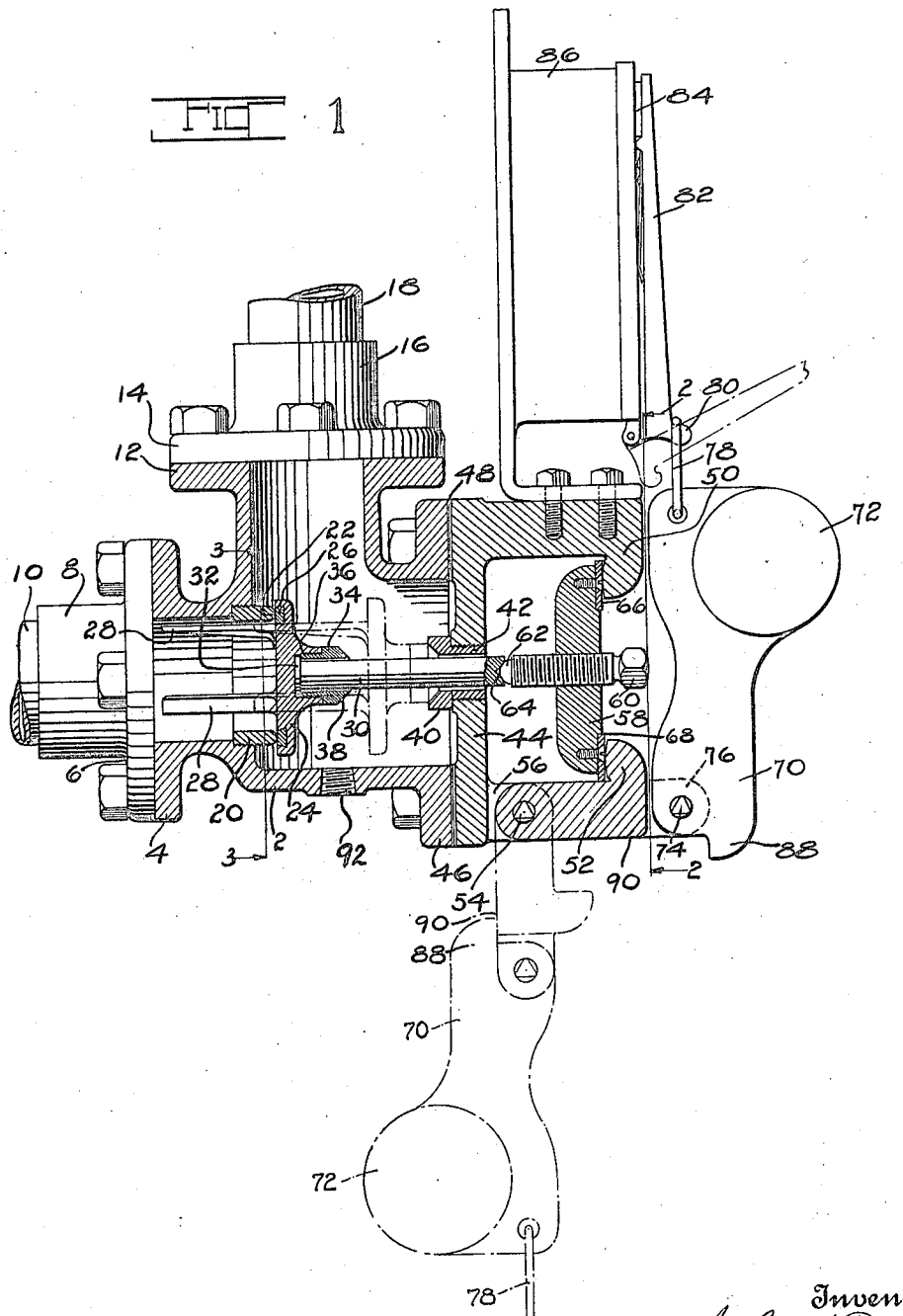

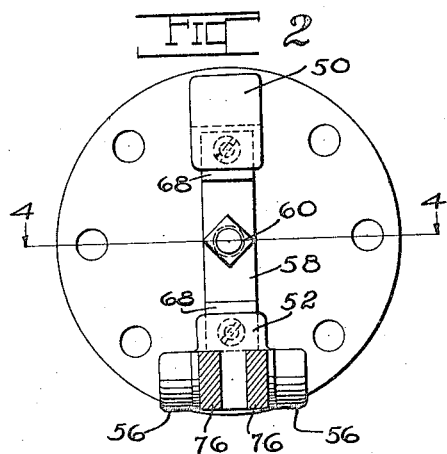
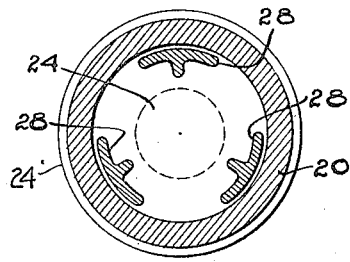
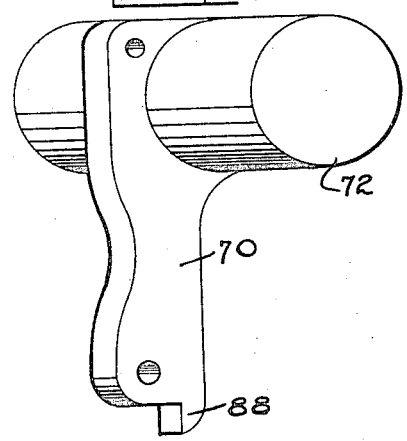

1,456,723

UNITED STATES PATENT OFFICE.

JOHN H. DERBY, OF NEW YORK, N. Y., ASSIGNOR TO GENERAL FIRE EXTINGUISHER COMPANY, OF PROVIDENCE, RHODE ISLAND, A CORPORATION OF NEW YORK.

QUICK-OPENING VALVE.

Application filed November 30, 1920. Serial No. 427,386.

*To all whom it may concern:*

Be it known that I, JOHN H. DERBY, a citizen of the United States, residing at New York city, New York, have invented certain new and useful Improvements in Quick-Opening Valves, of which the following is a clear, full, and exact description.

This invention relates to valves and valve controlling mechanisms and particularly to valves and valve controlling mechanisms by which quick opening may be obtained, as in fire prevention or fire extinguishing systems.

The invention aims not only to provide an improved valve which will remain effective to retain the water or other extinguishing fluid or liquid from being discharged until it is needed and will not be materially affected by corrosion or other influences which tend to affect its operativeness when left without attention for a long period of time, but also to provide means for retaining the valve in seated position which can be instantaneously released and which also will not be affected by corrosion, accumulation of dust and other influences which ordinarily tend to affect the action of such retaining and releasing means.

An important feature of the invention is the arrangement of a weight for effecting the release of the valve retaining means, which is so arranged with respect to the retaining member that it is to move into releasing position, that the weight first moves into impact with said retaining member to impart a shock or jar thereto before the full effective weight is brought to bear upon said member to move it to releasing position. This insures quick opening, even though there be an accumulation of dust, corrosion or other foreign matter in the parts.

Another important feature of the invention is the arrangement of electrically controlled means for retaining the weight against its valve releasing movement whereby the valve may be automatically operated in connection with either a fire alarm or an automatic fire prevention system.

Other objects and important features of the invention will appear from the following description and claims when considered in connection with the accompanying drawings, in which—

Fig. 1 is a vertical section through a quick releasing valve embodying the present invention;

Fig. 2 is a front view of the retaining part of the valve with the operating weight removed, this view being a section on the line 2—2 of Fig. 1;

Fig. 3 is a section on the line 3—3 of Fig. 2;

Fig. 4 is a section on the line 4—4 of Fig. 2; and

Fig. 5 is a perspective view of the valve releasing weight.

The illustrated valve housing 2 is shown as shaped somewhat like an ordinary T pipe coupling, except that one of the branches of the T is not connected with a pipe. To the flange 4 upon the inlet side of this housing or coupling, the flange 6 of a collar 8 threaded upon the pipe 10 leading from the city main or other source of water supply under pressure may be bolted, while to the flange 12 upon the outlet side of the housing may be bolted the flange 14 of a collar 16 carried by the pipe 18, which may itself be the dry pipe or stand pipe of a fire extinguishing installation, or may be a connecting pipe connecting with such a system.

The valve housing may be of cast iron. The parts of the valve itself are preferably, however, made of some material which will not readily corrode. The valve seat comprises a ring 20 threaded into the inlet part of the valve housing and preferably having a rounded edge 22 constituting the seat proper, the rounding of this edge reducing the actual contact surface between the valve and its seat. The ring 20 may be made of bronze.

The valve 24 is also preferably made of bronze or other suitable non-corroding material and preferably has an inset ring 26 of softer material, such, for example, as ordinary babbitt with a slight excess of lead, this inset ring 26 being opposed to the valve seat 22, whereby when the valve is forced tightly against this seat, the rounded edge 22 of the seat will be pressed slightly into the softer inset material 26 and thus insure a water-tight seating of the valve. The valve is also shown as provided with three centering fingers 28 which slide freely within the ring 20, but are so angularly spaced about the axis of the valve as shown in Fig. 3 that they insure the centering of the valve upon its seat.

The valve 24 is preferably also provided with a stem 30 which is shown as having a head 32 engaged by a collar 34 threaded into a boss 36 on the face of said valve remote from its seat-engaging face whereby the stem is confined on the valve. The collar 34 is preferably also of bronze and is preferably bevelled at one end as shown at 38, to fit into a correspondingly bevelled or coned seat 40 in a stem guide 42, thereby itself forming a valve to insure a water-tight closure about the valve stem 30 when the valve is open.

The stem guide 42 is carried in a casting comprising a disk-like portion 44 fitting against and adapted to be bolted to the flange 46 surrounding the third branch of the T-shaped casing, suitable packing 48 being preferably interposed between the disk part 44 of the casting and the flange 46 to insure water-tight connection. The stem guide 42 is located in actual alinement with the valve seat ring 20 and is shown as threaded into an opening in the part 44.

To retain the valve in closed position, a stationary hook-like member 50 is formed integral with the part 44 and a movable correspondingly shaped hook member 52 is fulcrumed at 54 between the ears 56 formed integral with said member 44 at the lower part thereof, the member 50 being carried upon the upper part of said member. A locking bar 58 which is shown to be of such length that it will span the hooks 50 and 52 when the lower hook 52 is in the position shown in Fig. 1, carries at its center a screw 60 having a squared head by which it may be adjusted through said bar 58 and this screw has a rounded end 62 bearing in a seat 64 in the end of the valve stem 30, the seat 64 being of the shape shown in Figs. 1 and 4, whereby the end 62 of the screw 60 will center itself readily in said seat when the valve is resting upon its seat and whereby moreover there will be no tendency of the screw 60 to bind against the end of the valve when the bar 58 rocks toward releasing position after it has been disengaged by the hook 52. To prevent sticking of the bar 58 against the hooks 50 and 52, due to corrosion, plates 66 and 68 of bronze or other material that does not readily corrode are preferably carried upon said bar 58 in position to engage the respective hooks 50 and 52. It will be noted furthermore, that the faces of the hooks 50 and 52 which engage the plates 66 and 68 are slightly rounded, thus reducing the bearing surfaces and also facilitating the movement of the hook 52 into releasing position.

In order to move the hook 52 into releasing relation to the locking bar 58 when it is desired to open the valve, means now to be described are provided. The illustrated means comprises a weight carrying arm 70 having the main mass 72 of its weight carried at the end of said arm remote from the fulcrum 74, upon which said arm is carried upon the hook 52, this fulcrum extending between ears 76 formed integral with said hook. The center of gravity of the weight upon the arm 70 is also offset to one side of the fulcrum 74, when the arm 70 is in its normal valve retaining position shown in Fig. 1. To maintain the arm 70 in this position and at the same time to insure its quick and preferably automatic release when it is desired to open the valve, the arm 70 is preferably provided with a link 78 in the form of a loop which loops over the short arm 80 of a bell crank, the other arm 82 of which is provided with a retaining member 84, entering an electrically controlled release box 86 of the type shown and described in my Letters Patent 1,187,135, granted June 13, 1916, this release box being preferably carried upon the upper hook member 50 as shown in Fig. 1 of the drawings.

As disclosed in said Letters Patent, the release box 86 employed with the quick releasing valve is preferably of the type which is operated by an increased flow of current and is preferably also of the type in which a light current normally flowing through the release box may be utilized to detect tampering with the box.

The arm 70 being fulcrumed upon the hook 52 is free to turn relatively to said hook when released, the shape and location of the hook being such that the hook will not necessarily begin to move as soon as the arm 70 begins to move. Provision is made for positively connecting the arm 70 to the hook 52 at such a point in the swing of the arm 70 as to obtain substantially the greatest leverage possible from the mass 72 of the weight upon the hook 52, this means being also so arranged that it acts to impart a shock or jar to the hook 52 at the time the connection is made. The illustrated means for effecting a positive connection between the arm 70 and the hook 52 during the swinging movement of the arm and at the same time imparting a shock or jar to the hook 52, comprises a lug or extension 88 on the arm 70 adapted to engage the underside of the hook 52 at 90, as shown in dotted lines in Fig. 1, thereby stopping the movement of the arm 70 relative to the hook 52 about the fulcrum 74 and insuring the movement of the arm 70 with the hook 52 about the fulcrum 54. It will be seen that as the lug or extension 88 strikes the surface 90 on the underside of the hook 52 after the arm 70 has swung from its vertical position shown in Fig. 1 to the horizontal position in which this engagement takes place, considerable momentum will have been acquired by the weight 72 and therefore a very marked shock will be imparted to the hook 52 which will tend to jar lose any dust or other foreign material which may have accumulated in the parts and at the same time will insure movement of the hook in spite of corrosion. A suitable weight for valves of the construction herein shown and of the sizes ordinarily employed with fire extinguishing installations on piers, wharves and similar places where dry pipe systems are desirable is about twenty-five (25) pounds.

To provide for draining from the fixture any accumulation of water which may condense and run down into it or which may get into it from any other cause, a drainage outlet 92 in the form of a small threaded opening in the housing 2 is provided. The opening 92 may be closed if desired by a suitable correspondingly threaded plug (not shown).

What I claim as new is—

1. In a device of the class described, a valve seat, a valve, means for normally holding said valve closed, said means comprising a retaining member movable into releasing position, and a weight carried by said retaining member for effecting such movement therof, said weight being first movable relatively to said member into impact therewith and being then movable with said member toward releasing position.

2. In a device of the class described, a valve seat, a valve, means for normally holding said valve closed, said means comprising a retaining member movable into releasing positon, and a weight for effecting such movement of said retaining member, said weight being movable on said member into impact therewith and being thereafter movable with said member toward releasing position.

3. In a device of the class described, a valve seat, a valve, means for normally holding said valve closed, said means comprising a retaining member movable into releasing position, a weight pivoted upon said member to swing relatively thereto, and cooperating means on said weight and said member for limiting the relative movement thereof whereby said member is moved by said weight to releasing position.

4. In a device of the class described, a valve casing, a valve seat, a valve, means for normally holding said valve closed, said means comprising a retaining member pivoted upon said casing to swing between retaining position and releasing position, and a weight pivoted upon said retaining member and arranged to swing thereon in the direction of the releasing movement into releasing impact with said retaining member and then to carry said retaining member with it into its releasing position.

5. In a device of the class described, a valve seat, a valve having a stem, a guide for said stem in the line of opening movement of said valve, a locking bar upon the side of said guide remote from said valve and arranged to engage said stem, stops for holding said locking bar in locking position, one of said stops being movable into releasing position, and a weight carried by the movable stop for moving it into releasing position, said weight being movable on said stop into impact therewith as it moves toward stop-releasing position.

Signed at New York city this 13th day of November, 1920.

JOHN H. DERBY.

Witnesses:
W. DAVIES,
JOHN R. HEALY.